US012607903B2

(12) United States Patent
Shikama

(10) Patent No.: US 12,607,903 B2
(45) Date of Patent: Apr. 21, 2026

(54) CAMERA MODULE AND ELECTRONIC DEVICE INCLUDING THE SAME

(71) Applicant: AAC Optics Solutions Pte. Ltd., Singapore City (SG)

(72) Inventor: Kazuo Shikama, Osaka (JP)

(73) Assignee: AAC Optics Solutions Pte. Ltd., Singapore City (SG)

( * ) Notice: Subject to any disclaimer, the term of this patent is extended or adjusted under 35 U.S.C. 154(b) by 135 days.

(21) Appl. No.: 18/389,690

(22) Filed: Dec. 19, 2023

(65) Prior Publication Data

US 2025/0093749 A1     Mar. 20, 2025

(30) Foreign Application Priority Data

Sep. 20, 2023     (JP) ................................. 2023-151830

(51) Int. Cl.
| *G03B 13/36* | (2021.01) |
| *G03B 9/12* | (2021.01) |
| *G03B 17/12* | (2021.01) |
| *G03B 17/56* | (2021.01) |

(52) U.S. Cl.
CPC .............. *G03B 13/36* (2013.01); *G03B 9/12* (2013.01); *G03B 17/12* (2013.01); *G03B 17/56* (2013.01)

(58) Field of Classification Search
CPC .......... G03B 13/36; G03B 9/12; G03B 17/12; G03B 17/56; G03B 2205/0069; G03B 3/10; G03B 30/00; H04N 23/54; H04N 23/57; H04N 23/67
See application file for complete search history.

(56) References Cited

U.S. PATENT DOCUMENTS

| 2003/0223742 A1* | 12/2003 | Aoshima | .................. | G03B 7/10 |
| | | | | 396/463 |
| 2004/0184800 A1* | 9/2004 | Miyawaki | ................ | G03B 9/08 |
| | | | | 396/449 |
| 2005/0025478 A1* | 2/2005 | Fujinaga | .................. | G03B 9/10 |
| | | | | 396/493 |
| 2012/0063005 A1* | 3/2012 | Aoshima | .................. | G03B 9/06 |
| | | | | 359/699 |
| 2020/0007730 A1* | 1/2020 | Doi | ........................ | G03B 13/36 |
| 2021/0103202 A1* | 4/2021 | Zhu | ........................ | G03B 17/02 |
| 2023/0273504 A1* | 8/2023 | Chen | ...................... | G03B 30/00 |
| | | | | 396/510 |
| 2023/0341746 A1* | 10/2023 | Chen | ........................ | G03B 9/06 |

* cited by examiner

*Primary Examiner* — Abdelaaziz Tissire
(74) *Attorney, Agent, or Firm* — Wlersch Law Group

(57) ABSTRACT

The embodiments of the present application relate to the technical field of camera devices, and disclose a camera module that uses the magnetic force between the driving coil group and the driven magnetic member group to achieve non-contact driving of the shading blade by the blade driving mechanism, so that the blade driving mechanism and the autofocus mechanism operate independently of each other without interference. Moreover, since the cylinder, the lens, the driving coil group, and the blade support member are all assembled along the optical axis, which avoids multi-directional protrusions of the camera module. The camera module provided according to the present application has a more concise structure and uses fewer components, which can reduce the assembly difficulty and manufacturing cost of the camera module. The present application also discloses an electronic device including a device body and a camera module arranged on the device body.

13 Claims, 17 Drawing Sheets

CAMERA MODULE AND ELECTRONIC DEVICE INCLUDING THE SAME

CROSS REFERENCE TO RELATED APPLICATIONS

The present application claims the benefit of priority under the Paris Convention to Japanese Patent Application No. 2023-151830 filed on Sep. 20, 2023, which is incorporated herein by reference in its entirety.

TECHNICAL FIELD

The embodiments of the present application relate to the technical field of camera devices, in particular to a camera module and an electronic device including the same.

BACKGROUND

An aperture (e.g., adjustable aperture) is used to change the size of the amount of light entering the optical system to participate in imaging. The aperture is arranged in the camera module, which can be adjusted to meet the shooting needs of different light and dark scenes. A focusing mechanism is configured to achieve the focusing of the camera module by changing the position of the lens, which allows the camera module to capture the target object more clearly. A combination of the aperture and the focusing mechanism can improve the shooting performance of the camera module. Therefore, the camera module with aperture and focusing mechanism applied to electronic devices, such as smartphones, tablets, etc., has been favored by a large number of consumers.

A blade drive mechanism is configured to drive multiple blades to move and changes the size of the openings formed by these blades, which can be applied to different optical units in cameras such as shutter, aperture, or optical filter. In an optical system that use a focusing mechanism to move lenses for adjustment, the blade drive mechanism may hinder the action and configuration of the focusing mechanism due to factors such as multi-directional protrusions caused by size, weight, and assembly direction. Although smaller blade drive mechanism made of shape memory metal can be used to overcome the problems of weight and volume, which increases the length of shape memory metal when it is necessary to make the opening size of the blade enclosure have a significant change, so that it is still not effective in solving various problems caused by the larger volume and weight of blade drive mechanism.

In addition, due to the need to avoid interference between the blade driving mechanism and the focusing mechanism, and during the focusing process, the blade driving mechanism also needs to act synchronously to appropriately block the light. In this way, the servo control of the focusing mechanism on the lens may be affected, and it is necessary to evenly distribute the weight of the blade driving mechanism throughout the entire circumference, which is difficult in design, and the reliability of the product completed based on the above design cannot be guaranteed.

Therefore, it is urgently to provide a camera module that can solve the above technical problems.

SUMMARY

An objective of embodiments of the present application is to provide a camera module and an electronic device that can simplify the structure of the camera module, avoid multi-directional protrusion of the camera module, and avoid interference between the autofocus mechanism and the driving blade mechanism in the camera module.

In order to solve the above technical problems, in a first aspect, a camera module is provided according to the present application, and the camera module includes: a lens having an optical axis; an autofocus mechanism including a cylinder. The cylinder has an axis coincided with the optical axis, and the lens is accommodated within the cylinder. The camera device further includes a driving coil group fixed on an inner wall of the cylinder, a blade support member coaxially arranged with the lens and fixed on an object side of the lens, a blade driven ring coaxially arranged with the lens and rotatably engaged with an object side of the blade support member, a driven magnetic member group fixed to the blade driven ring and arranged opposite to the driving coil group, and a shading blade. The shading blade is arranged between the blade support member and the blade driven ring, and is rotatably connected to the blade support member, the driving coil group is configured to drive the driven magnetic member group to drive the blade driven ring to rotate around the optical axis, so that the shading blade is driven to block or expose the lens.

As an improvement, the driven magnetic member group includes a first magnetic member and a second magnetic member, a magnetic pole of the first magnetic member facing towards the driving coil group has different polarities from a magnetic pole of the second magnetic member facing towards the driving coil group, and the first magnetic member and the second magnetic members are arranged at intervals circumferentially around the optical axis. The driving coil group includes multiple driving coils, and in response to different driving coils being energized, magnetic fields in different directions are generated, so that the first magnetic member and the second magnetic member are subjected to forces with a same direction to drive the blade driven ring to rotate around the optical axis.

As an improvement, there are multiple driven magnetic member groups arranged at intervals along a circumferential direction of the blade driven ring, and multiple driving coil groups arranged at intervals along a circumferential direction of the cylinder.

As an improvement, each of the multiple driving coil groups includes a cylindrical coil, and each of the multiple driven magnetic member groups includes a driven magnet, in response to the cylindrical coil being energized, the driven magnet is driven to depart from or approach to the cylindrical coil, and the driven magnet is configured to drive the blade driven ring to rotate to enable the shading blade to block or expose the lens.

As an improvement, there are multiple cylindrical coils arranged at intervals along a circumferential direction of the cylinder, and multiple driven magnets arranged at intervals along a circumferential direction of the blade driven ring, two magnetic poles of any respective two adjacent driven magnets are arranged opposite along the circumferential direction of the blade driven ring. In response to any respective two adjacent cylindrical coils being energized, magnetic fields in different directions are generated to force the driven magnet arranged between the respective two cylindrical coils in a same direction and drive the blade driven ring to rotate.

As an improvement, the blade support member is provided with a positioning hole extending axially, a positioning portion is provided on an image side of the shading blade, and the positioning portion is configured to rotatably extend into the positioning hole.

As an improvement, the blade driven ring is provided with a through groove extending radially along the blade driven ring, a sliding portion is provided on an object side of the shading blade, and the sliding portion is configured to slidably extend into the through groove.

As an improvement, the camera module further includes a flexible circuit board, wherein the flexible circuit board is sleeved on an outer circumference of the cylinder and electrically connected to the driving coil group.

As an improvement, the camera module further includes a position detecting element fixed on an inner wall of the cylinder and electrically connected to the flexible circuit board, wherein the position detecting element is configured to detect a position of the driven magnetic member group to detect a position of the shading blade.

In a second aspect, an electronic device is further provided according to the present application, and the electronic device includes a device body and a camera module according to any one above. The camera module is arranged on the device body.

In the camera module provided according to the present application, a driving coil group is arranged on an inner wall of the cylinder of the autofocus mechanism, and a driven magnetic member group is arranged opposite to the driving coil group. As the driven magnetic member group is arranged on the blade driven ring, in response to the driving coil group causing the driven magnetic member group to move, the driven magnetic member group drives the blade driven ring to rotate, which causes the shading blade to block or expose the lens. By using the magnetic force between the driving coil group and the driven magnetic member group, non-contact driving of the shading blade by the blade driving mechanism is achieved, so that the blade driving mechanism and the autofocus mechanism operate independently of each other without interference. Moreover, the cylinder, lens, driving coil group, and blade support member are all assembled along the optical axis direction, which avoids the multi-directional protrusion of the camera module. The camera module provided according to the present application has a more concise structure and fewer components, which can reduce the assembly difficulty and manufacturing cost of the camera module.

BRIEF DESCRIPTION OF THE DRAWINGS

One or more embodiments are described as examples with reference to the corresponding figures in the accompanying drawings, and the exemplary description does not constitute a limitation to the embodiments. Elements with the same reference numerals in the accompanying drawings are represented as similar elements. The figures in the accompanying drawings do not constitute a proportion limitation unless otherwise stated.

Figure 1:
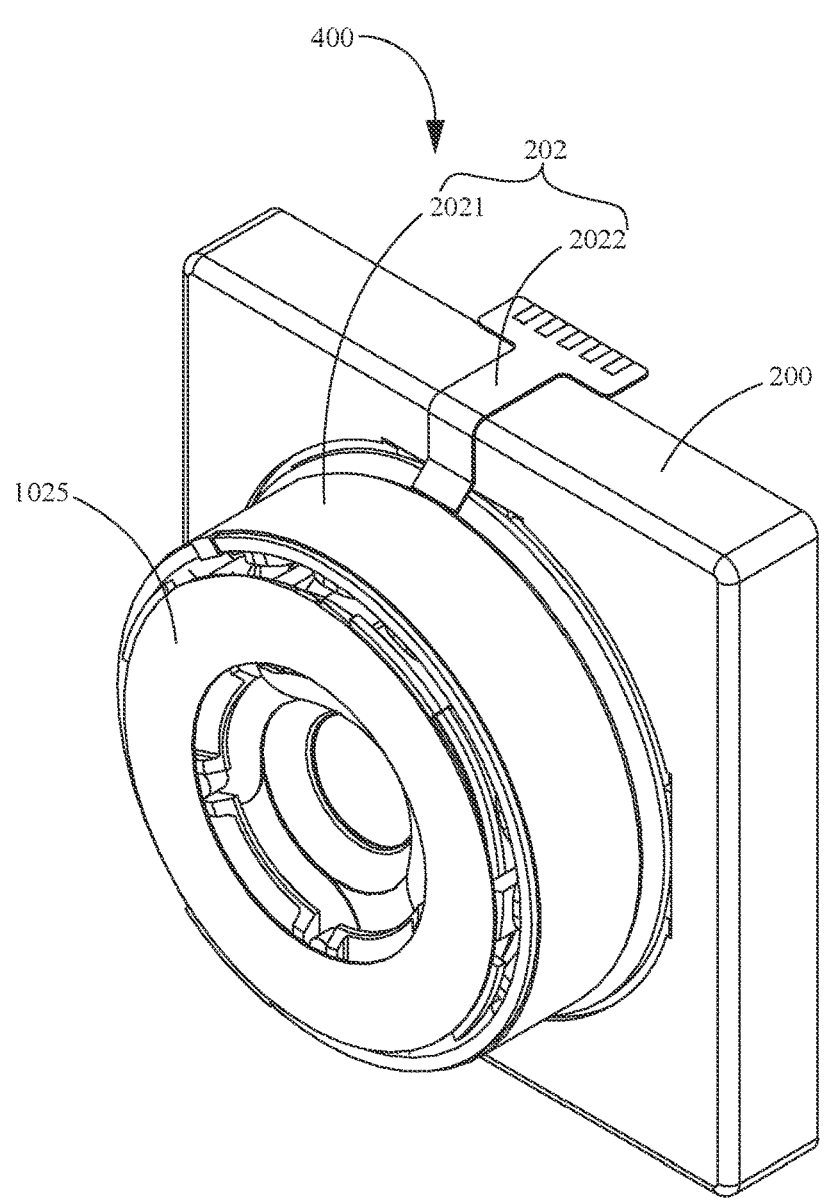
FIG. 1 is a schematic three-dimensional view of a camera module provided according to a first embodiment of the present application.
Figure 2:
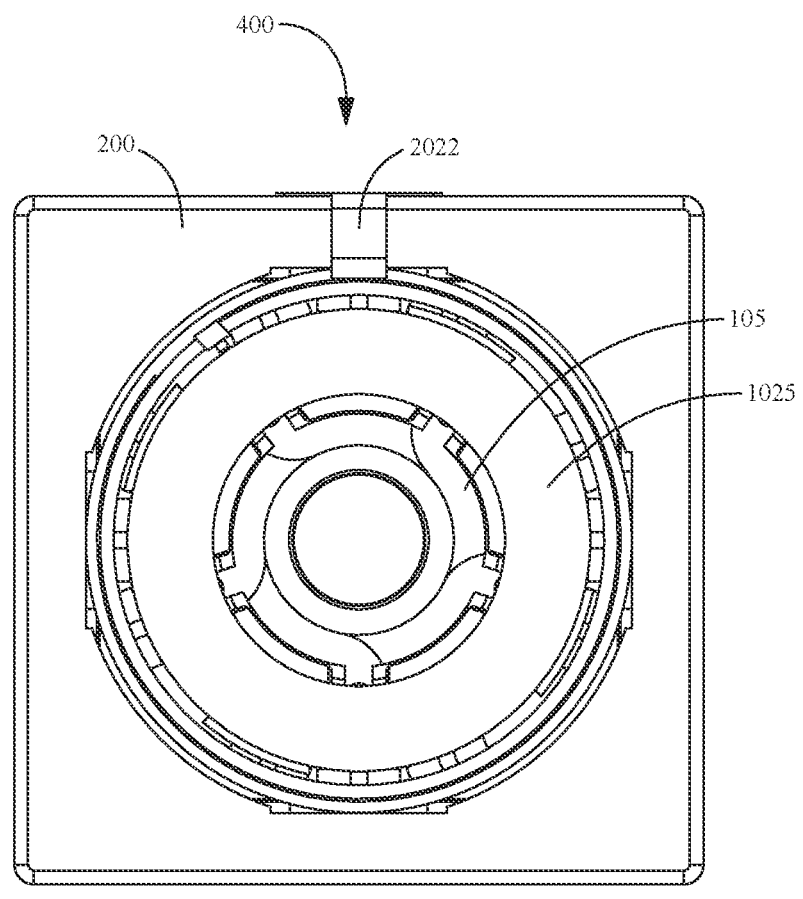
FIG. 2 is a front view of a lens exposed by a shading blade of the camera module provided according to the first embodiment of the present application.
Figure 3:
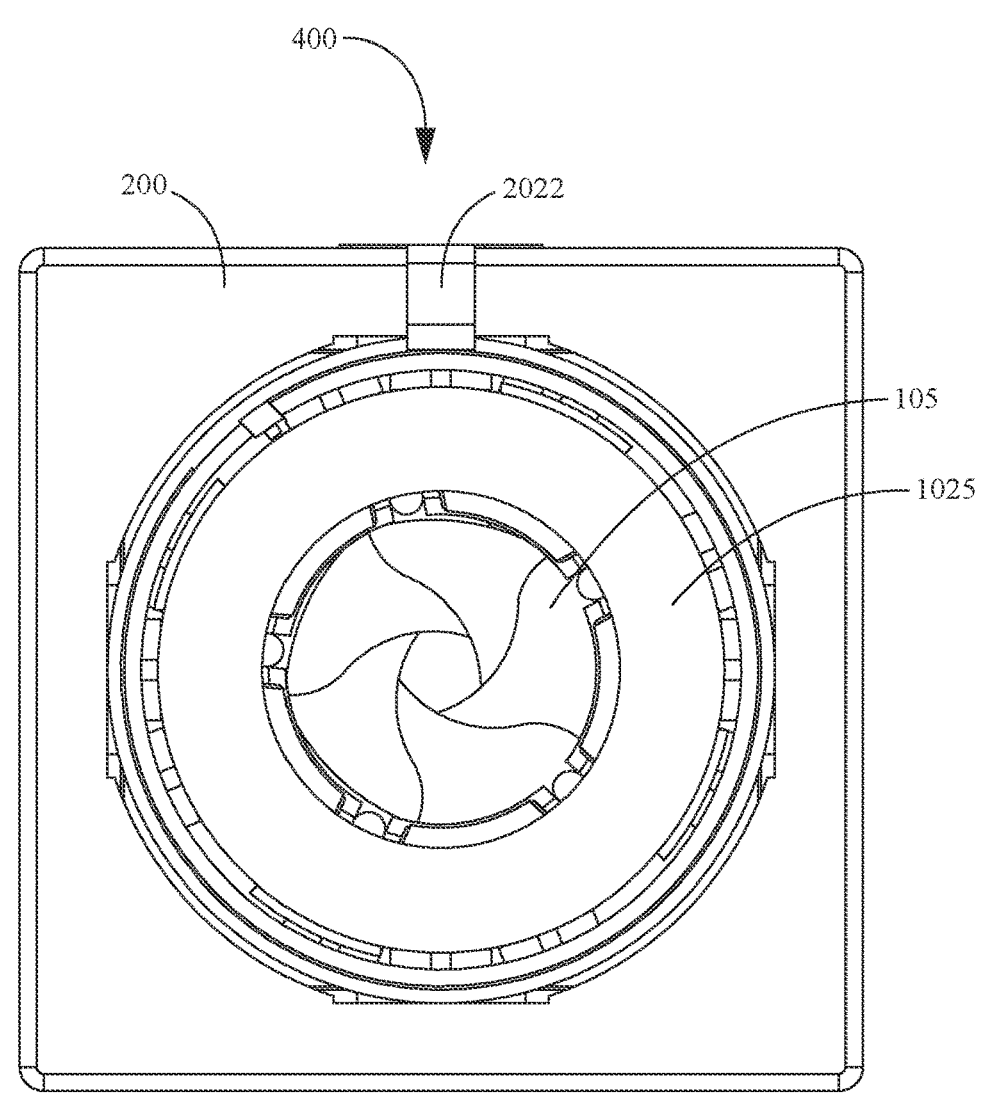
FIG. 3 is a front view of the lens blocked by the shading blade of the camera module provided according to the first embodiment of the present application.
Figure 4:
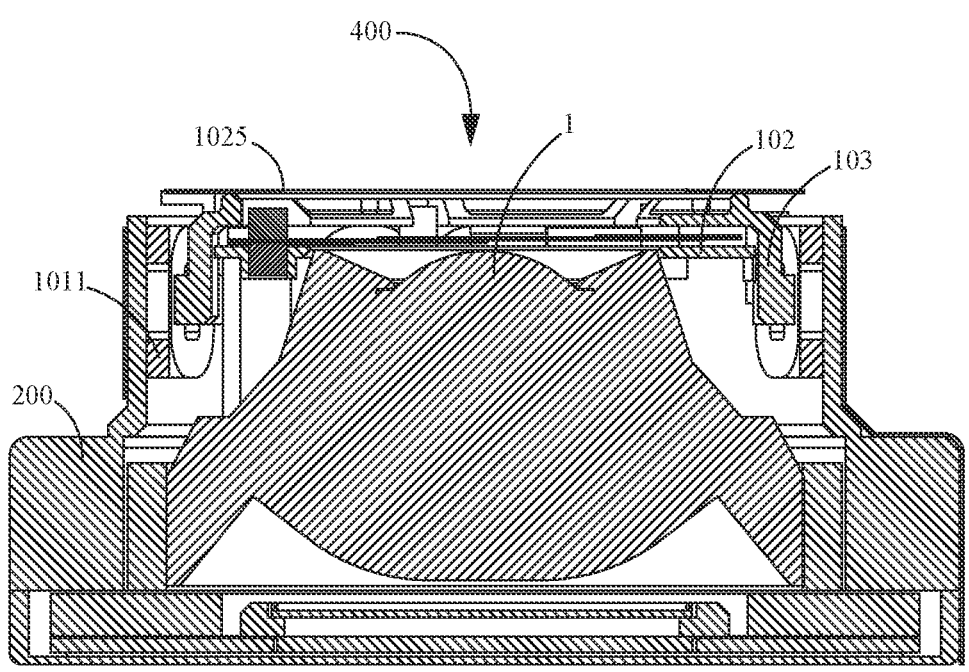
FIG. 4 is a cross-sectional view of the camera module provided according to the first embodiment of the present application.

| Reference numerals: | |
| --- | --- |
| 1 lens | 11 lens group |
| 12 lens casing | 101 driving coil group |
| 1011 driving coil | 1012 cylindrical coil |
| 102 blade support member | 1021 support ring portion |
| 1022 support feet | 1023 positioning hole |
| 1024 restraining portion | 1025 blade cover |
| 103 blade driven ring | 1031 through-hole |
| 1032 driven ring portion | 1033 mounting bracket |
| 1034 restraining box | 104 driven magnetic member group |
| 1041 first magnetic member | 1042 second magnetic member |
| 1043 driven magnet | 105 shading blade |
| 1051 positioning portion | 1052 sliding portion |
| 200 autofocus mechanism | 201 cylinder |
| 202 flexible circuit board | 2021 circumferential portion |
| 2022 connecting portion | 203 position detecting element |
| 300 anti-shaking mechanism | 301 sensor |
| 400 camera module | 500 electronic device |
| 510 device body | |

DETAILED DESCRIPTION

The embodiments of the present application will be described in detail below with reference to the accompanying drawings. However, those of ordinary skill in the art can understand that, in various embodiment of the present application, many technical details are set forth in order to provide the reader with a better understanding of the present application. However, the technical solutions claimed in the present application may be realized even without these technical details and various changes and modifications based on the following embodiments.

In the embodiments of the present application, the terms "up", "down", "left", "right", "front", "back", "top", "bottom", "inside", "outside", "center", "vertical", "horizontal", "transverse", "longitudinal", etc. indicate orientation or positional relationships based on the orientation or positional relationships shown in the drawings. These terms are mainly intended to better describe the present application and its embodiments, and are not intended to limit the device, component, or component indicated to have a specific orientation, or to be constructed and operated in a specific orientation.

Moreover, in addition to being used to indicate orientation or positional relationships, some of the above terms may also be used to indicate other meanings, such as the term "up" being used in some cases to indicate a certain attachment or connection relationship. For those of ordinary skills in the art, the specific meanings of these terms in the present application can be understood based on specific circumstances.

In addition, the terms "installation", "provided", "arranged", "opened", "connected", and "communicated" should be understood broadly. For example, it may be fixed connection, detachable connection, or integral forming. It may be a mechanical connection or an electrical connection. It may be directly connected, indirectly connected through intermediate media, or internally connected between two devices, members, or components. For those of ordinary skills in the art, the specific meanings of the above terms in the present application can be understood based on specific circumstances.

In addition, the terms "first", "second", etc. are mainly used to distinguish different devices, members, or components (specific types and constructions may be the same or different), and are not used to indicate or imply the relative importance and quantity of the indicated devices, members, or components. Unless otherwise specified, "multiple" means two or more.

The first embodiment of the present application provides a camera module 400, as shown in FIG. 1 to FIG. 5, and the camera module 400 includes a lens 1 having an optical axis LA, and an autofocus mechanism 200 including a cylinder 201. The cylinder 201 has an axis coincided with the optical axis, and the lens 1 is accommodated within the cylinder 201. The camera device 400 further includes a driving coil group 101 fixed on an inner wall of the cylinder 201, a blade support member 102 coaxially arranged with the lens 1 and fixed on an object side of the lens 1, a blade driven ring 103 coaxially arranged with the lens 1 and rotatably engaged with an object side of the blade support member 102, a driven magnetic member group 104 fixed to the blade driven ring 103 and arranged opposite to the driving coil group 101, and a shading blade 105. The shading blade 105 is arranged between the blade support member 102 and the blade driven ring 103, and is rotatably connected to the blade support member 102, the driving coil group 101 is configured to drive the driven magnetic member group 104 to drive the blade driven ring 103 to rotate around the optical axis LA, so that the shading blade 105 is driven to block or expose the lens 1.

In the camera module 400 provided according to the present application, the driving coil group 101 is arranged on an inner wall of the cylinder 201 of the autofocus mechanism 200, and a driven magnetic member group 104 is arranged opposite to the driving coil group 101. As the driven magnetic member group 104 is arranged on the blade driven ring 103, in response to the driving coil group 101 causing the driven magnetic member group 104 to move, the driven magnetic member group 104 drives the blade driven ring 103 to rotate, which causes the shading blade 105 to block or expose the lens 1. By using the Lorenze force between the driving coil group 101 and the driven magnetic member group 104, non-contact driving of the shading blade 105 by the blade driving mechanism is achieved, so that the blade driving mechanism and the autofocus mechanism 200 operate independently of each other without interference. Moreover, the cylinder 201, lens 1, driving coil group 101, and blade support member 102 are all assembled along the optical axis LA, which avoids the multi-directional protrusion of the camera module 400. The camera module 400 provided according to the present application has a more concise structure and fewer components, which can reduce the assembly difficulty and manufacturing cost of the camera module 400.

It should be noted that the shading blade 105 does not completely block the lens 1, that is, in response to the shading blade 105 blocking the maximum area on the lens 1, there is still a certain area of the lens 1 that can be exposed. It can be understood that if necessary, in response to the shading blade 105 blocking the maximum area on the lens 1, the lens 1 can be completely blocked.

In this embodiment, the lens 1 includes a lens group 11 and a lens casing 12, where the lens casing 12 surrounds the lens group 11 and is fixed to the outer edge of the lens group 11. There is a gap between the lens casing 12 and the cylinder 201, and both the driving coil group 101 and the driven magnetic member group 104 are arranged in the gap.

Figure 7:
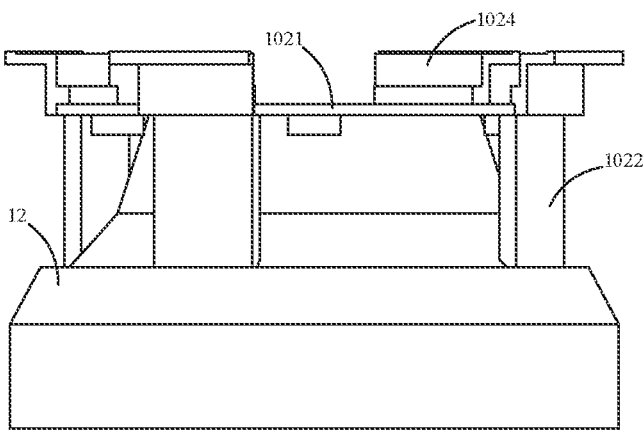
FIG. 7 is a side view of a blade support member fitted with the lens provided according to the first embodiment of the present application.
Figure 8:
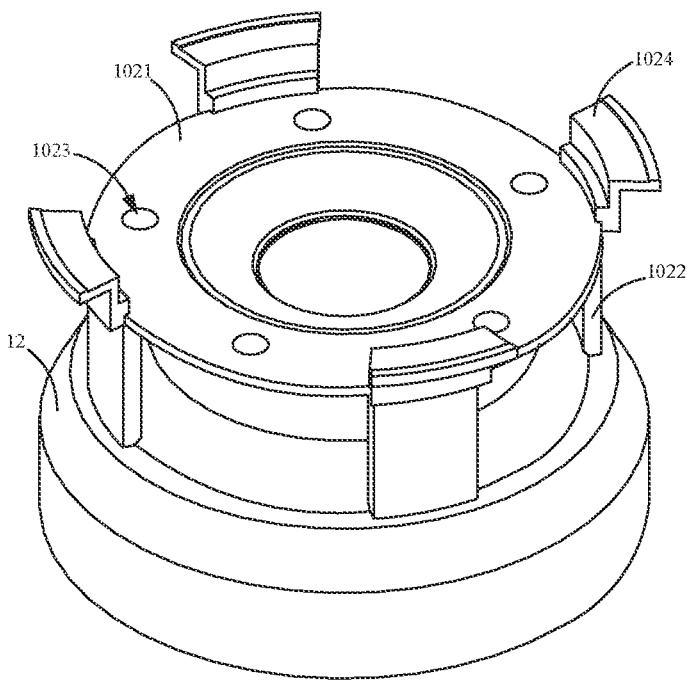
FIG. 8 is a schematic three-dimensional view of the blade support member fitted with the lens provided according to the first embodiment of the present application.
Figure 9:
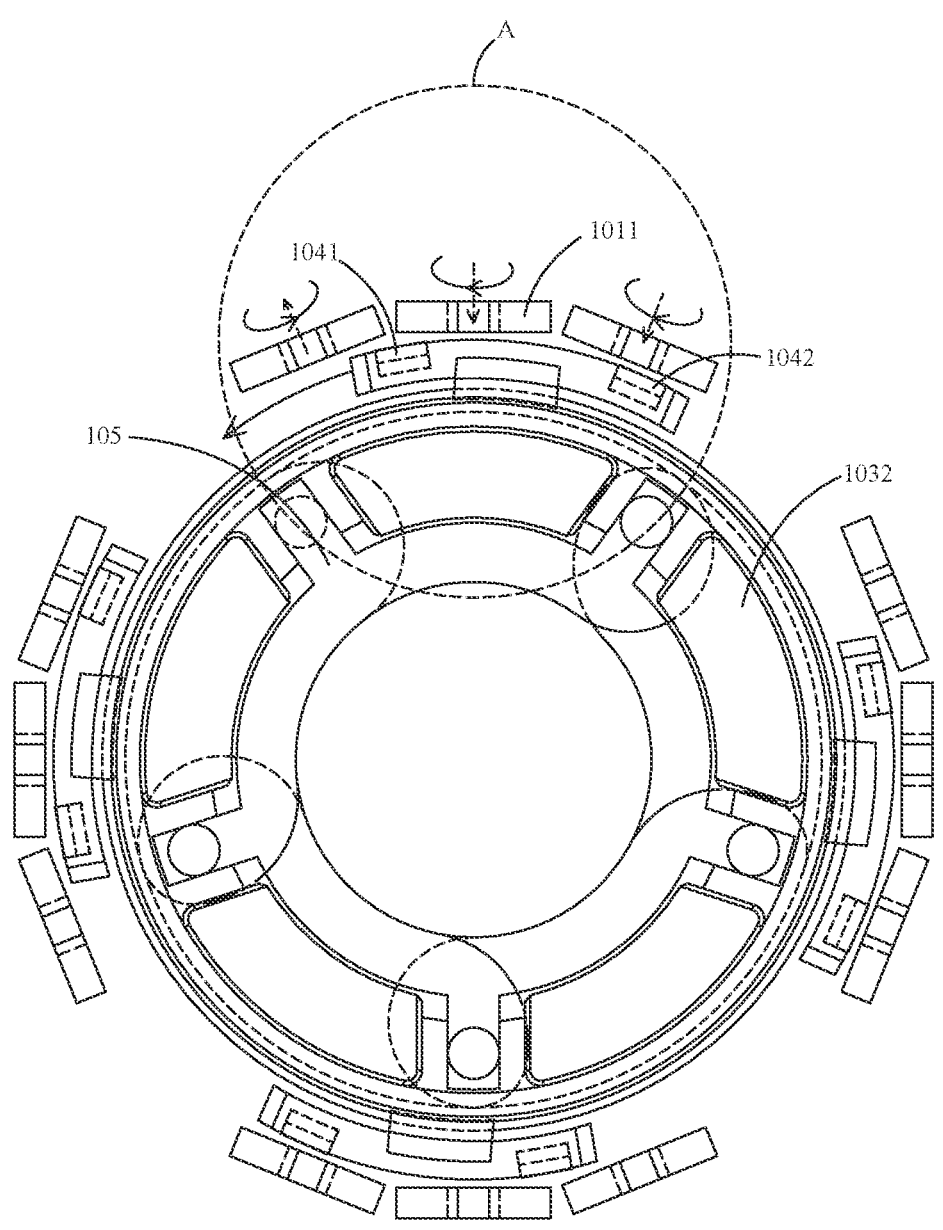
FIG. 9 is a schematic configuration view of a driving coil group and a driven magnetic member group provided according to the first embodiment of the present application.

Referring to FIG. 7 and FIG. 8 together, in this embodiment, the blade support member 102 has a support ring portion 1021 and multiple support feet 1022 fixedly connected to the support ring portion 1021. The multiple support feet 1022 are arranged at intervals along the circumferential direction of the support ring portion 1021 and extend along the optical axis LA. An end of each respective support feet 1022 away from the support ring portion 1021 abuts against the lens casing 12, which maintains an appropriate distance between the support ring portion 1021 and the object side edge of the lens 1 along the direction of the optical axis LA. In some embodiments, the support ring portion 1021 and the multiple support feet 1022 are integrally formed.

Figure 5:
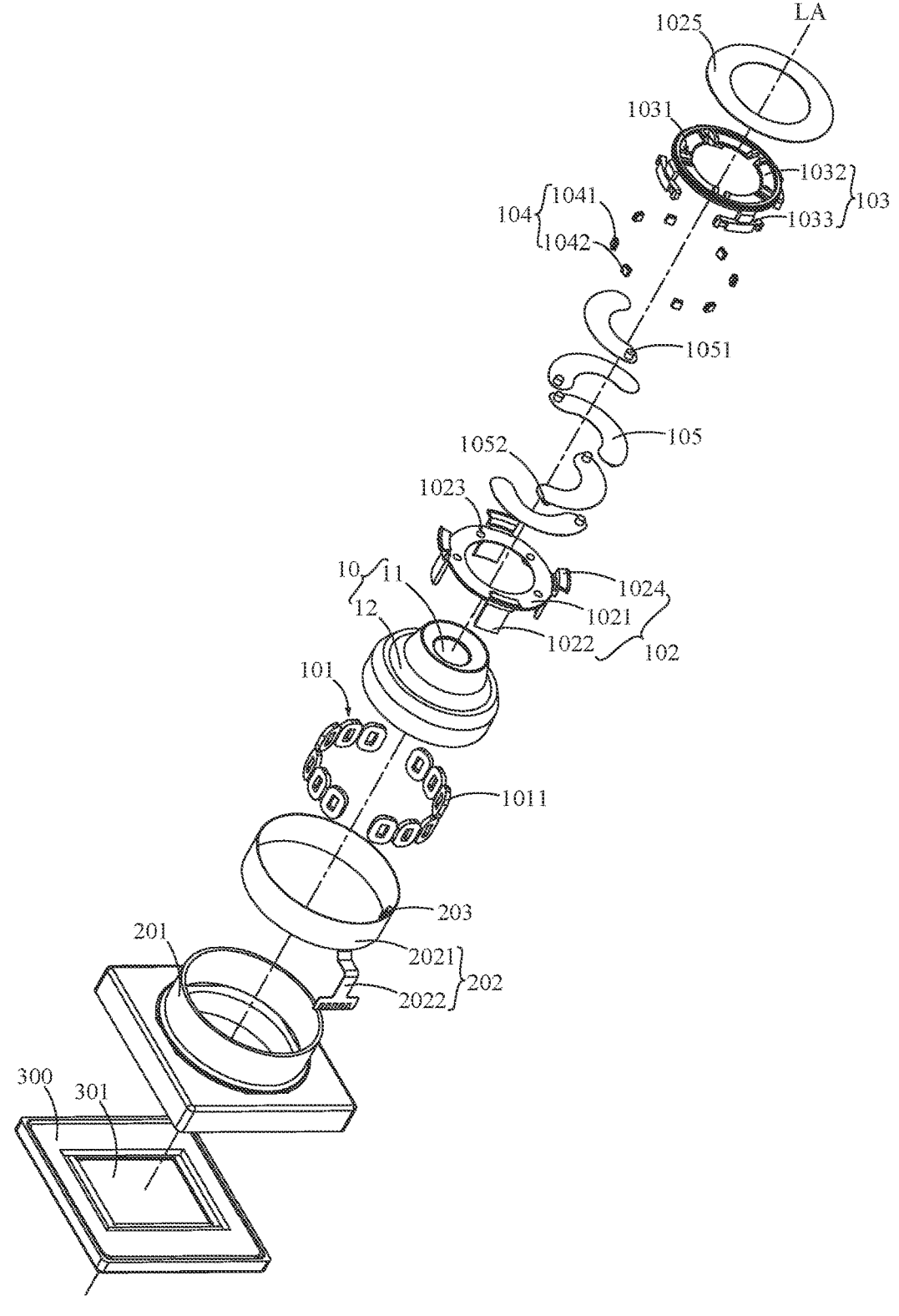
FIG. 5 is a structural explosive view of the camera module provided according to the first embodiment of the present application.

Optionally, the support feet 1022 may be 2, 3, or more, such as 4 support feet shown in FIG. 5, FIG. 7, and FIG. 8. The specific size and number of these feet can be adjusted adaptively based on the actual size and weight requirements of the camera module 400, which will not limited thereto.

In other alternative embodiments, the blade support member 102 and the lens casing 12 are integrally formed. In this way, when assembling the camera module 400, the operations of fixing the blade support member 102 to the lens 1 can be reduced, such as fixing the blade driven ring 103, which is pre-set with the shading blade 105 or the magnetic driven member group 104, to the blade support member 102.

Furthermore, the blade support member 102 is provided with a positioning hole 1023 extending axially, and a positioning portion 1051 is provided on the image side of the shading blade 105. The positioning portion 1051 is configured to rotatably extend into the positioning hole 1023. Specifically, the support ring portion 1021 of the blade support member 102 can be provided with multiple positioning holes 1023, such as 5 shown in FIG. 8, and the positioning holes 1023 are circular holes, which are uniformly arranged at intervals along the circumference of the support ring portion 1021. In addition, there are 5 shading blades 105 arranged correspondingly. Each shading blade 105 is provided with a positioning portion 1051 on the image side. The positioning portion 1051 is a cylindrical structure, and the positioning portion 1051 extends into the positioning hole 1023 in a one-to-one correspondence. Each respective shading blade 105 can rotate relative to the support ring portion 1021 with the axis of its own positioning portion 1051 as the rotation axis.

Referring back to FIG. 5 and FIG. 6, furthermore, the blade driven ring 103 is provided with a through groove 1031 extending radially along the blade driven ring 103. A sliding portion 1052 is provided on the side surface of the shading blade 105, which can slide into the through groove 1031. It can be understood that in response to the number of shading blades 105 being 5, the number of through grooves 1031 is also 5, and the 5 through grooves 1031 are uniformly arranged at intervals along the circumference of the blade driven ring 103. Each respective shading blade 105 is provided with a sliding portion 1052, which extends into a respective through groove 1031 in a one-to-one correspondence.

Figure 6:
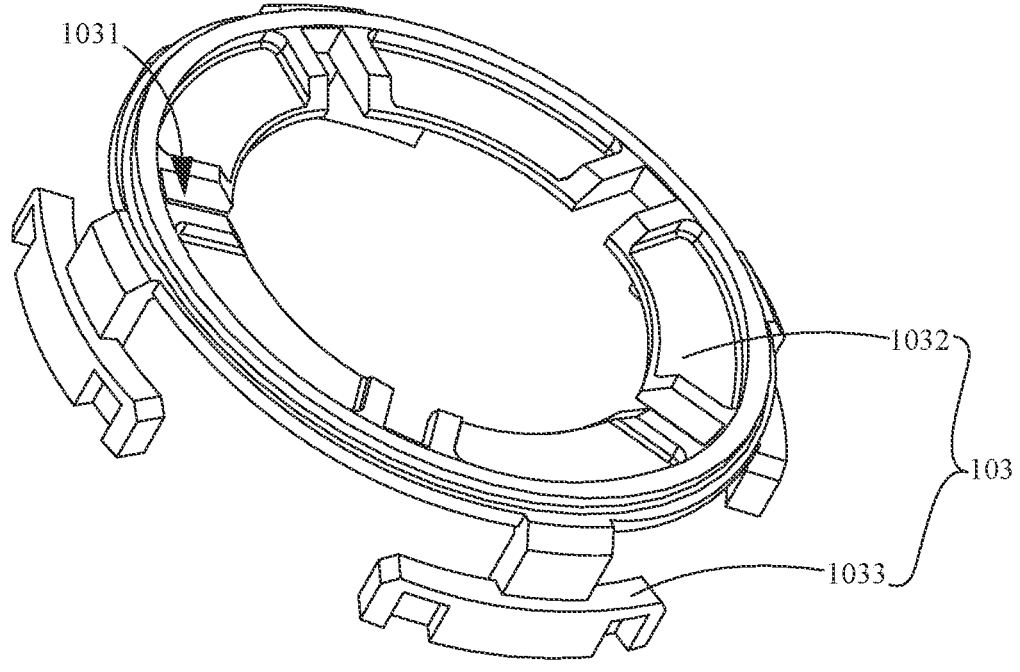
FIG. 6 is a schematic three-dimensional view of a blade driven ring of the camera module provided according to the first embodiment of the present application.

Reference is made back to FIG. 6. Specifically, the blade driven ring 103 includes a driven ring portion 1032 and a mounting bracket 1033 fixedly connected to the driven ring portion 1032, which extends along the optical axis LA and towards the lens 1. The through-hole 1031 is formed on the driven ring portion 1032, and the driven magnetic member group 104 is arranged on the mounting bracket 1033.

In this embodiment, the shading blade 105 may be an arc-shaped sheet. The positioning portion 1051 is provided at one end of the arc-shaped sheet and the sliding portion 1052 is provided at the other end of the arc-shaped sheet. There is an appropriate gap between the blade support member 102 and the blade driven ring 103, and a blade chamber is formed by the blade support member 102 and the blade driven ring 103 to accommodate the shading blade 105.

In response to the driving coil group 101 being energized, the Lorentz force is used to drive the driven magnetic member group 104 to move. The driven magnetic member group 104 is configured to drive the blade driven ring 103 to rotate, and the sliding portion 1052 moves under the action of the inner wall of the through groove 1031. As the shading blade 105 can only rotate under the restraining of the positioning portion 1051, the sliding portion 1052 slides within the through groove 1031. Thereby causing the multiple shading blades 105 to converge or separate. In response to multiple shading blades 105 being converged, the through-hole area formed by the multiple shading blades 105 decreases and the lens 1 is blocked, which reduces the amount of external light entering the lens 1. In response to the multiple shading blades 105 being separated, the area of the through-holes formed by the multiple shading blades 105 increases and the lens 1 is exposed, which increases the amount of incoming light from the outside into the lens 1.

Since the sliding portion 1052 only needs to be able to slide in the through groove 1031, there are no special restrictions on the shape of the sliding portion 1052, such as being protrusion, prismatic, or cylindrical. In practical applications, considering the influence of friction, it is still the best way to arrange the sliding portion 1052 in a cylindrical shape. Due to the smooth movement of the sliding portion 1052 within the through-hole 1031, the shading blade 105 can form any size of through-hole within a preset range, which forms the best shading effect and improves the shooting performance of the camera module 400.

Generally speaking, the more shading blades 105 there are, the closer the through-holes formed by these shading blades 105 are to a circle, and the more precise the dimming is. However, considering the counterweight, the number of shading blades 105 is generally 3 to 7, which is 5 in this embodiment. Similarly, considering the issue of counterweight, the length of a single shading blade 105 arranged between 30% and 60% of the circumference of the support ring portion 1021. In response to the length of the shading blade 105 exceeding 60% of the circumference of the support ring portion 1021, a weight ratio of the aperture composed of the shading blade 105 will increase, which will cause the center of gravity of the camera module 400 to raise when driving the lens 1. In response to the length of the shading blade 105 being less than 30% of the circumference of the support ring portion 1021, interference may occur between the ends of different shading blades 105 during the movement of the shading blade 105, that is, an end of the shading blade 105 with the positioning portion 1051 may interfere with an end of the adjacent shading blade 105 with the sliding portion 1052 during the movement.

Similarly, the area of the through-hole formed by the shading blade 105 is 30% to 60% of a graphic area covered by the outer edge of the shading blade 105. In this way, it can ensure that the overall weight of the camera module 400 is small and easy to assemble, while also avoiding interference between the shading blades 105.

Reference is made back to FIG. 8. In this embodiment, in order to restrain the position of the driven ring portion 1032 in the direction perpendicular to the optical axis LA, the support ring portion 1021 is provided with multiple restraining portions 1024 along the circumference. The restraining portion 1024 is an L-shaped arc segment in cross-section. In response to the driven ring portion 1032 being engaged on the support ring portion 1021, the multiple restraining portions 1024 are arranged at the outer edge of the driven ring portion 1032, which prevents the driven ring portion 1032 from moving in the direction perpendicular to the optical axis LA when driven or due to vibration of the camera module 400.

Reference is made back to FIG. 1 and FIG. 5. Furthermore, the camera module 400 further includes a blade cover 1025, which is a circular ring. The blade cover 1025 is arranged on the object side of the driven ring portion 1032, and the multiple restraining portions 1024 are arranged on the outer edge of the driven ring portion 1032. The multiple restraining portions 1024 can prevent the blade cover 1025 from moving in the direction perpendicular to the optical axis LA. In addition, the multiple restraining portions 1024 can cooperate with the blade cover 1025 to limit the position of the driven ring portion 1032 in the direction of the optical axis LA, which prevents the driven ring portion 1032 from detaching from the support ring portion 1021.

Figure 10:
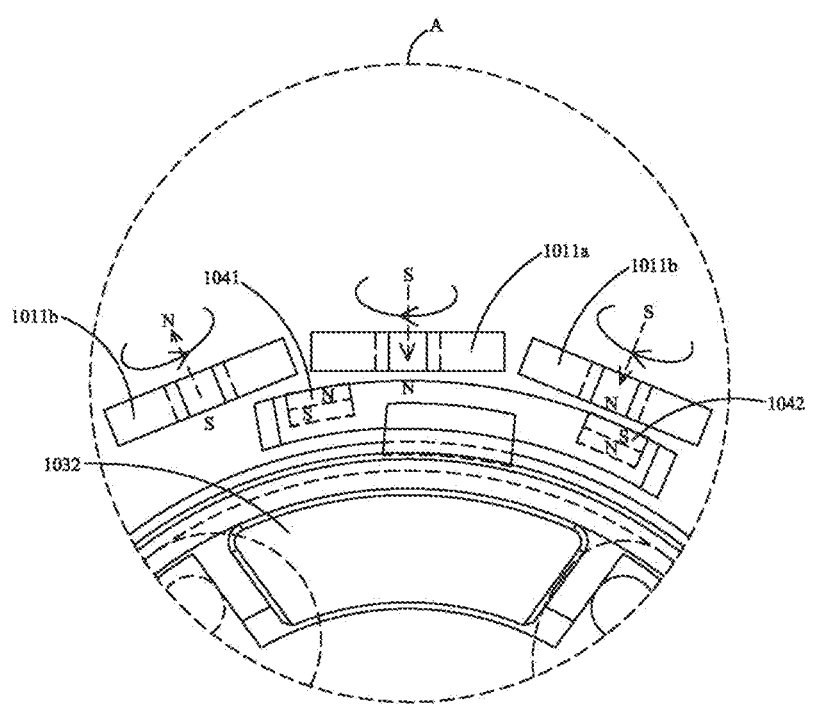
FIG. 10 is an enlarged view of region A shown in FIG. 9.

Specifically, as shown in FIG. 10, the driving coil group 101 includes three driving coils 1011. Each of the three driving coils 1011 may be a coil wound in an elliptical or capsule shape as a whole, with its circular plane facing the lens 1. More specifically, the driving coil 1011 located in the middle is the first driving coil 1011a, while the two driving coils 1011 on both sides of the first driving coil 1011a are the second driving coils 1011b, the second driving coil 1011b arranged on the left side may be wound in a counterclockwise direction, and the second driving coil 1011b arranged on the right side and the first driving coil 1011a may be wound in a clockwise direction. The mounting bracket 1033 has a portion extending along the circumference of the blade driven ring 103, where the first magnetic member 1041 and the second magnetic member 1042 are fixedly arranged at opposite ends of the portion on the circumference of the blade driven ring 103. The south pole of the first magnetic member 1041 faces the lens 1, the north pole of the first magnetic member faces the driving coil 1011. The south pole of the second magnetic member 1042 faces the driving coil 1011, and the north pole of the second magnetic member 1042 faces the lens 1.

In response to the driving coil 1011 being energized, for example, the current direction of the second driving coil 1011b on the left side is the same as the winding direction of the driving coil 1011, that is counterclockwise. And the current direction of the first driving coil 1011a in the middle and the second driving coil 1011b on the right side are the same as the wind direction of the driving coil 1011, that is clockwise. In this case, the south pole of the magnetic field generated by the left driving coil 1011 points towards the lens 1, that is, the south pole of the magnetic field of the second driving coil 1011b on the left side is opposite to the north pole of the first magnetic member 1041, and the north pole of the magnetic field of the first driving coil 1011a is opposite to the south pole of the second magnetic member 1042. The north pole of the magnetic field generated by the second driving coil 1011b on the right side is opposite to the south pole of the second magnetic member 1042. Therefore, the second driving coil 1011b on left side attracts the first magnetic member 1041, the first driving coil 1011a repels the first magnetic member 1041, and also attracts the second magnetic member 1042. The second driving coil 1011b on the right side attracts the second magnetic member 1042. Finally, the first magnetic member 1041 and the second magnetic member 1042 rotate counterclockwise along the optical axis LA. As the first magnetic member 1041 and the second magnetic member 1042 are fixed to the blade driven ring 103, the blade driven ring 103 rotates counterclockwise along the optical axis LA, thereby driving the shading blade 105 to rotate to block the lens 1.

In response to the driving coil 1011 being energized, for example, the current direction of the driving coil 1011 on the left side is the same as the winding direction of the driving coil 1011, that is counterclockwise. And the current direction of the driving coil 1011 in the middle and the driving coil 1011 on the right side are the same as the wind direction of the driving coil 1011, that is clockwise. In this case, the south pole of the magnetic field generated by the left driving coil 1011 points towards the lens 1, that is, the south pole of the magnetic field of the left driving coil 1011 is opposite to the north pole of the first magnetic member 1041, and the north pole of the magnetic field of the middle driving coil 1011 is opposite to the south pole of the second magnetic member 1042. The north pole of the magnetic field generated by the right driving coil is opposite to the south pole of the second magnetic member 1042. Therefore, the left driving coil 1011 attracts the first magnetic member 1041, the middle driving coil 1011 repels the first magnetic member 1041, and also attracts the second magnetic member 1042. The right driving coil 1011 attracts the second magnetic member 1042. Finally, the first magnetic member 1041 and the second magnetic member 1042 rotate counterclockwise along the optical axis LA. As the first magnetic member 1041 and the second magnetic member 1042 are fixed to the blade driven ring 103, the blade driven ring 103 rotates counterclockwise along the optical axis LA, thereby driving the shading blade 105 to rotate to block the lens 1.

It can be understood that in response to the current direction of the driving coil 1011 being changed, the blade driven ring 103 rotates clockwise along the optical axis LA, thereby driving the shading blade 105 to rotate to expose the lens 1.

It should be noted that the shading blade 105 may also be configured to rotate to block the lens 1 in response to the blade driven ring 105 rotating clockwise, and to rotate to expose the lens 1 in response to the blade driven ring 105 rotating counterclockwise. In addition, the winding direction of different driving coils 1011 may be the same or different, as long as the direction of the current passing through different driving coils 1011 are different. For example, in response to the winding direction of all driving coils 1011 being the same, different currents in different directions can be applied to different driving coils 1011. Alternatively, in response to the winding direction of different driving coils 1011 being different, currents in the same direction can be applied, and different winding directions will cause the current to show different directions in different driving coils 1011. The orientation of the magnetic poles of the first magnetic member 1041 and the second magnetic member 1042 may also be adjusted according to actual needs and in combination with the characteristics of the Lorentz force, which will not be further described here.

In this embodiment, there are multiple driven magnetic member groups 104, and the multiple driven magnetic member groups 104 are arranged at intervals along the circumferential direction of the blade driven ring 103. There are multiple driving coil groups 101, and the multiple driving coil groups 101 are arranged at intervals along the circumference of the cylinder 201. Specifically, the multiple driving coil groups 101 and the multiple driven magnetic member groups 104 are uniformly arranged at intervals around the optical axis LA and in a one-to-one correspondence. For example, there are four driving coil groups 101 symmetrically arranged around the optical axis LA, and there are four driven magnetic member groups 104 arranged in a one-to-one correspondence to the four driving coil groups 101.

The multiple driving coil groups 101 and the multiple driven magnetic member groups 104 are arranged to apply uniform force on the driven ring portion 1032 in a circumferential direction, which makes the rotation of the driven ring portion 1032 more stable and provides greater driving force, thereby making it easier to drive the driven ring portion 1032 to rotate.

Figure 11:
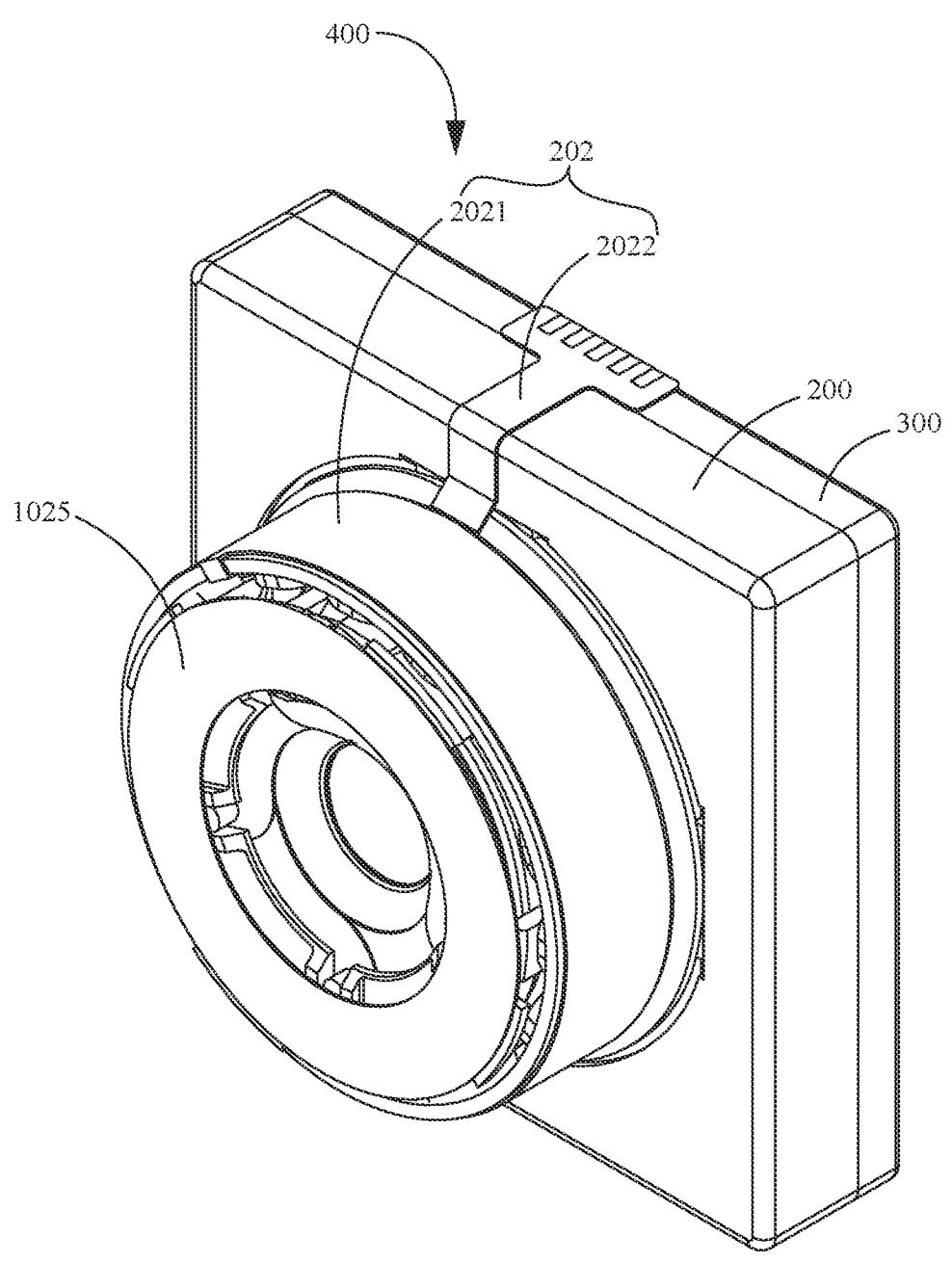
FIG. 11 is a schematic three-dimensional view of the camera module including an anti-shaking mechanism provided according to the first embodiment of the present application.

Referring to FIG. 5 and FIG. 11, in this embodiment, the camera module 400 further includes a flexible circuit board 202 mounted on an outer circumference of the cylinder 201 and electrically connected to the driving coil group 101.

Specifically, the flexible circuit board 202 includes a circumferential portion 2021 sleeved on the outer circumference of the cylinder 201 and a connecting portion 2022 connected to the circumferential portion 2021 and electrically connected to a control chip (not shown in the figure). The control chip is configured to provide electrical energy and control signals to the driving coil group 101 through the flexible circuit board 202, and the driving coil group 101 receives electrical energy and control signals based on the received electrical energy and control signals, so as to generate corresponding magnetic fields and drive the magnetic member group 104 to rotate the blade driven ring 103 by these magnetic fields.

Reference is made back to FIG. 5. In this embodiment, the camera module 400 further includes a position detecting element 203 fixed on the inner wall of the cylinder 201 and electrically connected to the flexible circuit board 202. The position detecting element 203 is configured to detect a position of the driven magnetic member group 104 to detect a position of the shading blade 105.

Specifically, the position detecting element 203 may be a Hall element, and in response to the first magnetic member 1041 and the second magnetic member 1042 being driven and rotated by the driving coil 1011, the magnetic field of the first magnetic member 1041 and the second magnetic member 1042 at the position detecting element 203 constantly changes. The position detecting element 203 is configured to obtain positions of the first magnetic member 1041 and the second magnetic member 1042, or any of them, by detecting these changes. Moreover, the area of the through-hole formed by the shading blade 105 can be calculated by obtaining a preset corresponding relationship between the rotation angle of the blade driven ring 103 and the variation of the area of the through-hole formed by the shading blade 105, that is, by detecting the position of the first magnetic member 1041 and/or the second magnetic member 1042.

In some alternative embodiments, the flexible circuit board 202 may also be installed inside the autofocus mechanism 200 and extending from the autofocus mechanism 200 and electrically connected to the driving coil group 101 and the position detecting element 203.

Referring to FIG. 11, in this embodiment, the camera module 400 further includes an anti-shaking mechanism 300 arranged on the image side of the autofocus mechanism 200 to perform anti-shaking correction for the camera module 400.

Specifically, the camera module 400 includes a sensor 301 arranged on the object side of the anti-shaking mechanism 300. The sensor 301 is configured to image, and the anti-shaking mechanism 300 is configured to drive the sensor to move to perform anti-shaking correction.

In this embodiment, there is also a camera module casing (not shown in the figure). At least the blade cover 1025, the blade driven ring 103, and the shading blade 105 are accommodated within the camera module casing. The camera module casing is configured to press the blade cover 1025, thereby fixing the blade cover 1025 along the extending direction of the optical axis LA on the object side of the blade cover 1025.

Figure 12:
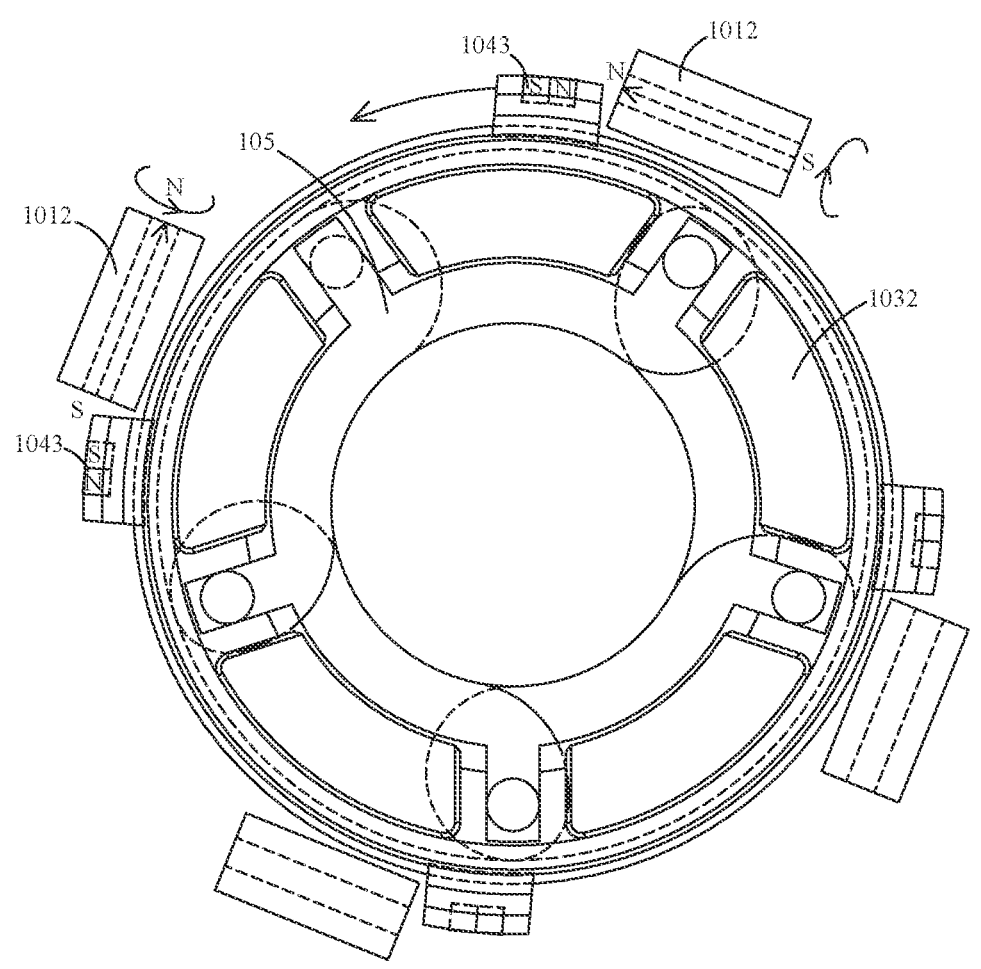
FIG. 12 is a schematic configuration view of a driving coil group and a driven magnetic member group provided according to a second embodiment of the present application.

A camera module is provided according to the second embodiment of the present application, which is roughly the same as the first embodiment. The main difference is that, referring back to FIG. 12, the configuration of the driving coil group 101 and the driven magnetic member group 104 is simplified. Specifically, the driving coil group 101 includes a cylindrical coil 1012, and the driven magnetic member group 104 includes a driven magnet 1043. In response to the cylindrical coil 1012 being energized, the driven magnet 1043 is driven to depart from or approach to the cylindrical coil 1012, and the driven magnet 1043 drives the blade driven ring 103 to rotate to drive the shading blade 105 to block or expose the lens 1.

Among them, the driving coil group 101 includes a cylindrical coil 1012, and the axis of the cylindrical coil 1012 is perpendicular to the optical axis LA. When the cylindrical coil 1012 is energized, the generated magnetic field applies magnetic force to the driven magnet 1043, causing the driven magnet 1043 to move away from or near the cylindrical coil 1012, thereby driving the blade driven ring 103 to rotate, to enable the shading blade 105 to converge or separate. In this way, the structure of the driving coil group 101 and the driven magnetic member group 104 can be simplified, which reduces the number of components, thereby reducing the assembly difficulty and manufacturing cost of the camera module.

In this embodiment, there are multiple cylindrical coils 1012 arranged at intervals along the circumferential direction of the cylinder 201. There are multiple driven magnets 1043 arranged at intervals along the circumferential direction of the blade driven ring 103. Two magnetic poles of any respective two adjacent driven magnets 1043 are arranged opposite along the circumferential direction of the blade driven ring 103. In response to any respective two adjacent cylindrical coils 1012 being energized, magnetic fields in different directions are generated to force the driven magnet 1043 arranged between the respective two cylindrical coils 1012 in a same direction and drive the blade driven ring 103 to rotate.

The winding direction of all the cylindrical coils 1012 as the same and the clockwise direction as the positive direction is taken as an example. Specifically, the north pole of the driven magnet 1043 arranged above is arranged along the positive direction relative to its own south pole, and the north pole of the driven magnet 1043 arranged on the left is arranged in a negative direction relative to its own south pole. The cylindrical coil 1012 arranged on the upper right side is in a positive direction relative to the driven magnet 1043 arranged above, which provides currents with different directions to the cylindrical coil 1012 arranged on the upper right side and the cylindrical coil 1012 arranged on the left side, as shown by an arrow next to the cylindrical coil 1012 in the figure. At this point, the cylindrical coil 1012 arranged on the upper right side will generate a magnetic field with a north pole facing the negative direction, and the cylindrical coil 1012 arranged on the left side will generate a magnetic field with a north pole facing the opposite direction. In this case, the north pole of the magnetic field of the cylindrical coil 1012 arranged on the upper right side is opposite to the north pole of the driven magnet 1043 arranged above, thereby driving the driven magnet 1043 to rotate in the negative direction. At the same time, the north pole of the magnetic field of the cylindrical coil 1012 arranged on the left side is opposite to the south pole of the driven magnet 1043 arranged above, which further attracts the driven magnet 1043 to rotate in the negative direction. And, the south pole of the magnetic field of the cylindrical coil 1012 arranged on the left is opposite to the south pole of the driven magnet 1043 arranged on the left, which pushes the driven magnet 1043 arranged on the left to rotate in the negative direction. That is to say, one cylindrical coil 1012 uses the repulsive force of an isotropic magnetic field to cause a driven magnet 1043 to rotate in the negative direction, and the other cylindrical coil 1012 uses the attraction force of an anisotropic magnetic field to attract the driven magnet 1043 to continue rotating in the negative direction.

It can be understood that in this embodiment, a force in the same direction is mainly applied to the two magnetic poles of the driven magnet 1043 arranged between the two adjacent cylindrical coils 1012, thereby causing the driven magnet 1043 to drive the blade driven ring 103 to rotate. As for the specific winding direction of the cylindrical coil 1012, the specific method of providing current, and the specific setting method of the driven magnet 1043, adaptive adjustments can be made according to the actual situation, which will not be specifically limited thereto this embodiment.

Figure 13:
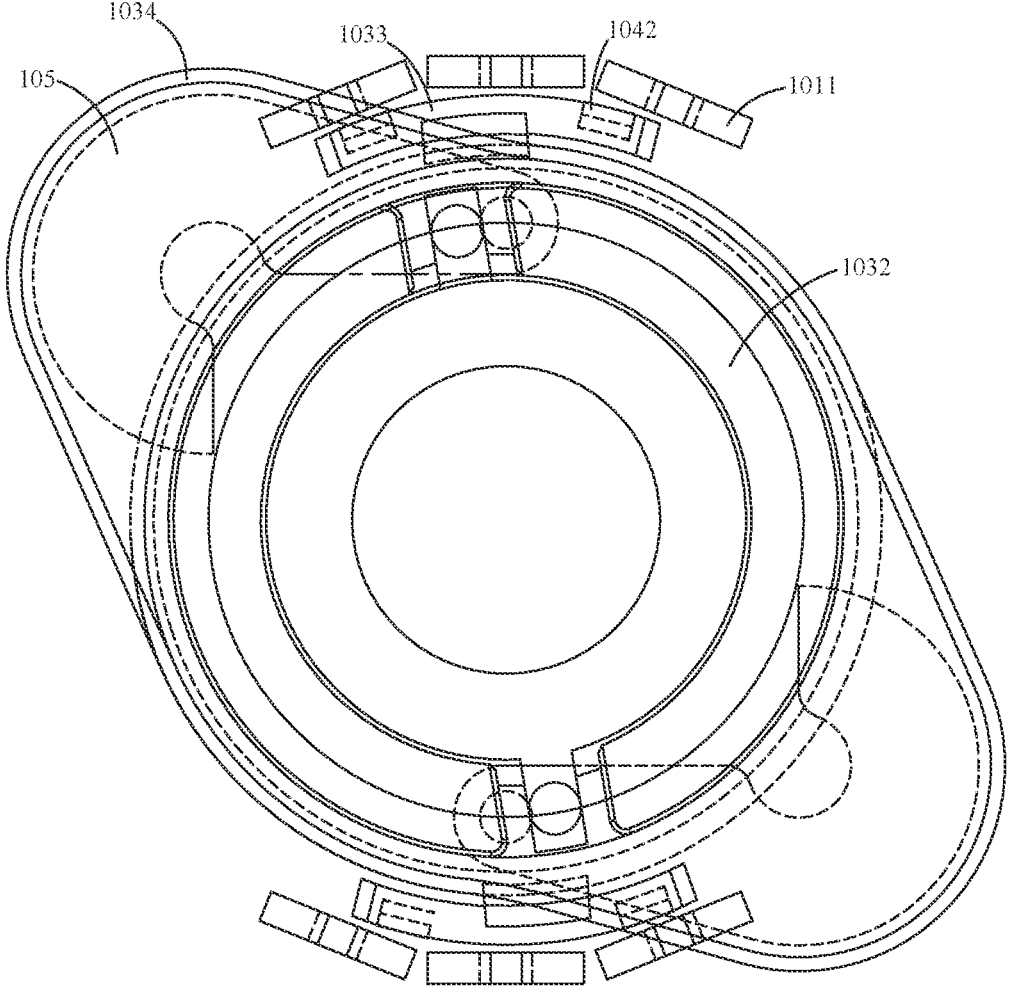
FIG. 13 is a front view of a lens exposed by a shading blade of a camera module provided according to a third embodiment of the present application.
Figure 14:
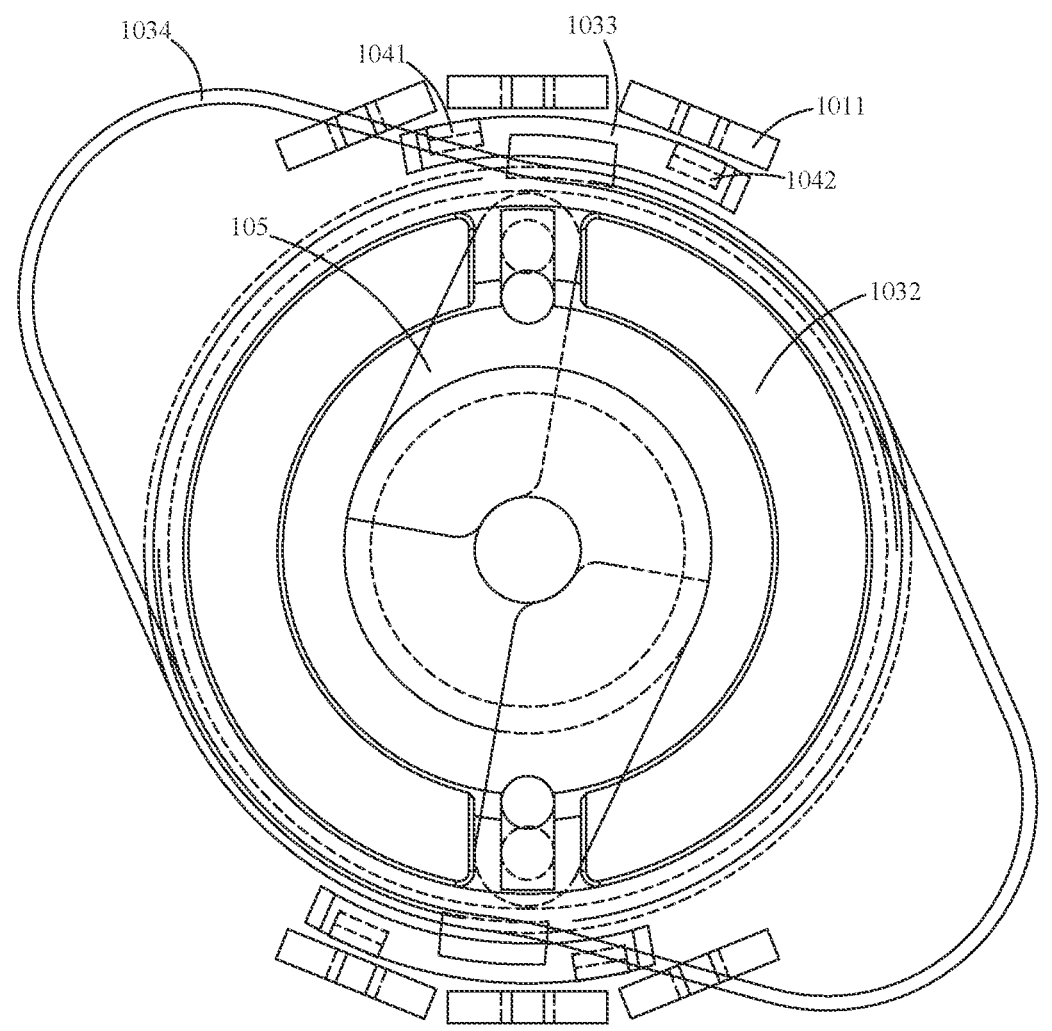
FIG. 14 is a front view of the lens blocked by the shading blade of the camera module provided according to the third embodiment of the present application.

A camera module is provided according to the third embodiment of the present application, which is roughly the same as the first embodiment. The main difference is that, referring to FIG. 13 and FIG. 14 together, the number of shading blades 105 is reduced. In this embodiment, there are two shading blades 105, and two driving coil groups 101 and two driven magnetic member groups 104. The two shading blades 105, the two driving coil groups 101 and the two driven magnetic member groups 104 are arranged at intervals along the optical axis LA. This embodiment reduces the number of driving coil groups 101, driven magnetic member groups 104, and shading blades 105, which simplifies the structure of the camera module, thereby reducing the assembly difficulty of the camera module.

Due to the fact that there are two shading blades 105 in this embodiment, the positioning hole 1023 on the support ring portion 1021 is adaptively arranged as two, and the through groove 1031 on the driven ring portion 1032 is also arranged as two. Moreover, in order to make the counterweight of the camera module more reasonable, the optical axis LA can be used as the symmetry axis, and two positioning holes 1023 can be symmetrically arranged on the support ring portion 1021, and the two through grooves 1031 can be symmetrically arranged on the driven ring portion 1032. Therefore, after the shading blades 105 are installed, the positions of the two shading blades 105 are symmetrically arranged.

In this embodiment, the shading blade 105 is J-shaped, and both the positioning portion 1051 and the sliding portion 1052 are provided with a straight portion of the shading blade 105 away from the end of a bending portion, but the straight portion and the bending portion 1052 are staggered in a plane perpendicular to the optical axis LA. Among them, an inner edge of the bending portion of the shading blade 105 is a circular arc segment. In response to the two shading blades 105 being completely converged, the inner edges of the bending portion of the two shading blades 105 form a circular hole, and the center of the circular hole roughly falls on the optical axis LA, that is, the center may fall on or close to the optical axis LA. Due to the shading blade 105, the driving coil group 101 and the driven magnetic member group 104 being arranged at intervals along the optical axis LA, i.e. the shading blade 105 is arranged on the object side of the driving coil group 101 and the object side of the driven magnetic member group 104. In this way, in response to the shading blade 105 rotating, neither the driving coil group 101 nor the driven magnetic member group 104 will interfere with the shading blade 105. In addition, the overall weight of the camera module can be distributed around the optical axis LA.

In this way, even in dynamic photography, it is possible to achieve any change in the amount of light entering the camera module. By improving the optical performance of the camera module and accurately controlling exposure, the phenomenon of black and white images during shooting can be effectively suppressed.

Furthermore, due to the large movement amplitude of the free end (i.e. the bending portion) of the shading blade 105 in this embodiment, in order to avoid the detachment of the shading blade 105 and to avoid damage to the camera module due to excessive rotation amplitude, a spindle shaped restraining frame 1034 is arranged on the image side of the driven ring 1032. A contour of an inner edge of a tip of the restraining frame 1034 is matched with a contour of an outer edge of the shading blade 105. It should be noted that the "tip" in this embodiment refers to the portion of the spindle shaped restraining frame 1034 with a smaller curvature radius.

Figure 15:
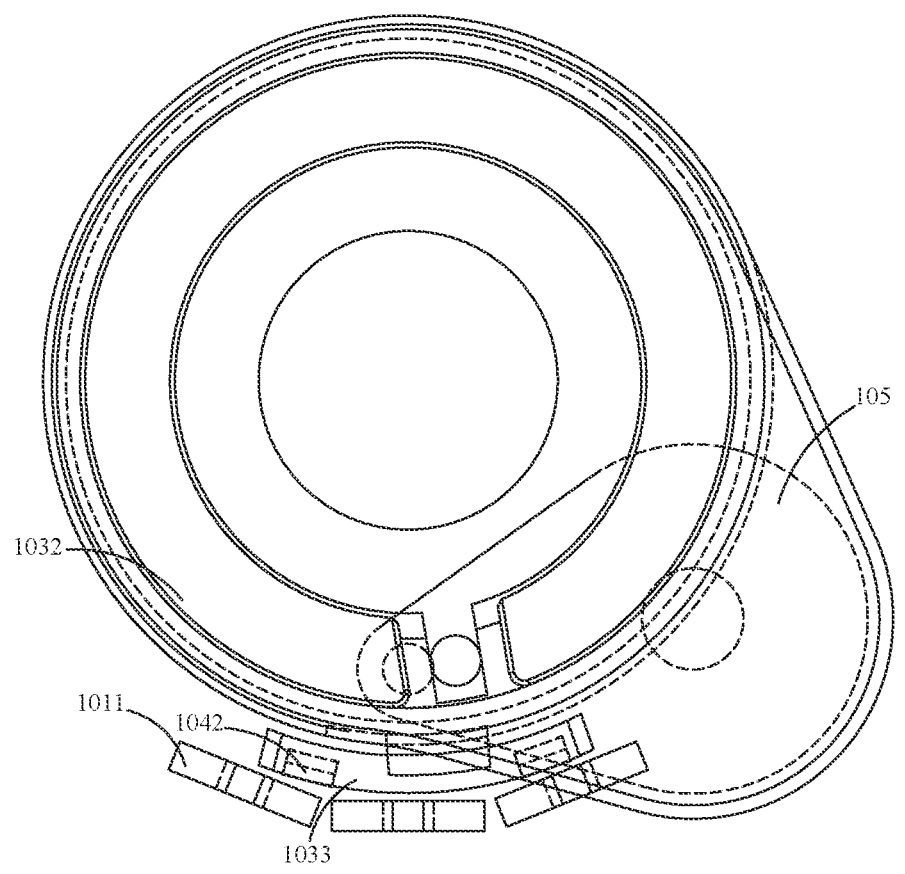
FIG. 15 is a front view of a lens exposed by a shading blade of a camera module provided according to a fourth embodiment of the present application.
Figure 16:
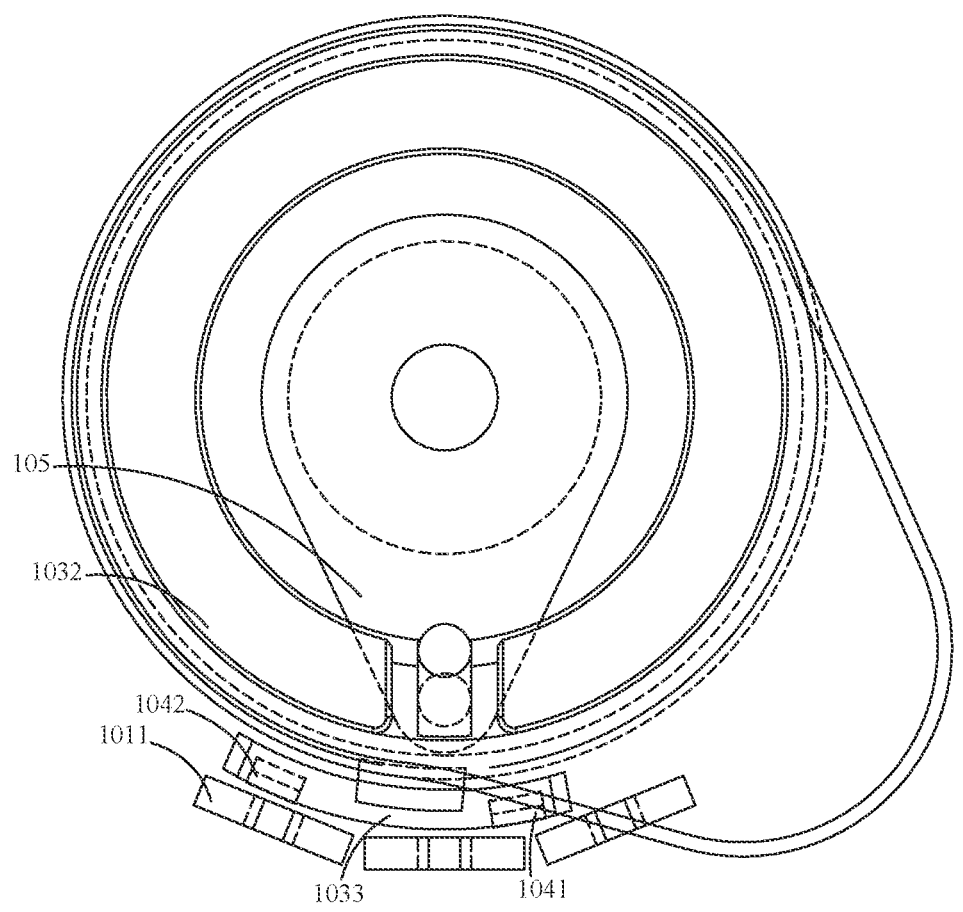
FIG. 16 is a front view of the lens blocked by the shading blade of the camera module provided according to the fourth embodiment of the present application.

A camera module is provided according to the fourth embodiment of the present application, which is roughly the same as the third embodiment. The main difference is that, referring to FIG. 15 and FIG. 16 together, the number of shading blades 105 is further reduced. In this embodiment, there is one shading blade 105, one driving coil group 101 and one driven magnetic member group 104.

In this embodiment, the shading blade 105 is in a water droplet shape as a whole, and the positioning portion 1051 and the sliding portion 1052 are both arranged at the end of the shading blade 105 with a smaller curvature radius, and are staggered on the plane perpendicular to the optical axis LA. A part of the shading blade 105 with a larger curvature radius is provided with a circular hole. In response to the shading blade 105 reaching the maximum shading area for the lens 1, the center of the circular hole roughly falls on the optical axis LA, which may be fall on or close to the optical axis LA.

Furthermore, the restraining frame 1034 may also be a water droplet shaped restraining frame that matches the shape of the shading blade 105.

This embodiment simplifies the structure of the camera module by further reducing the number of driving coil groups 101, driven magnetic member groups 104, and shading blades 105, thereby reducing the assembly difficulty of the camera module.

Figure 17:
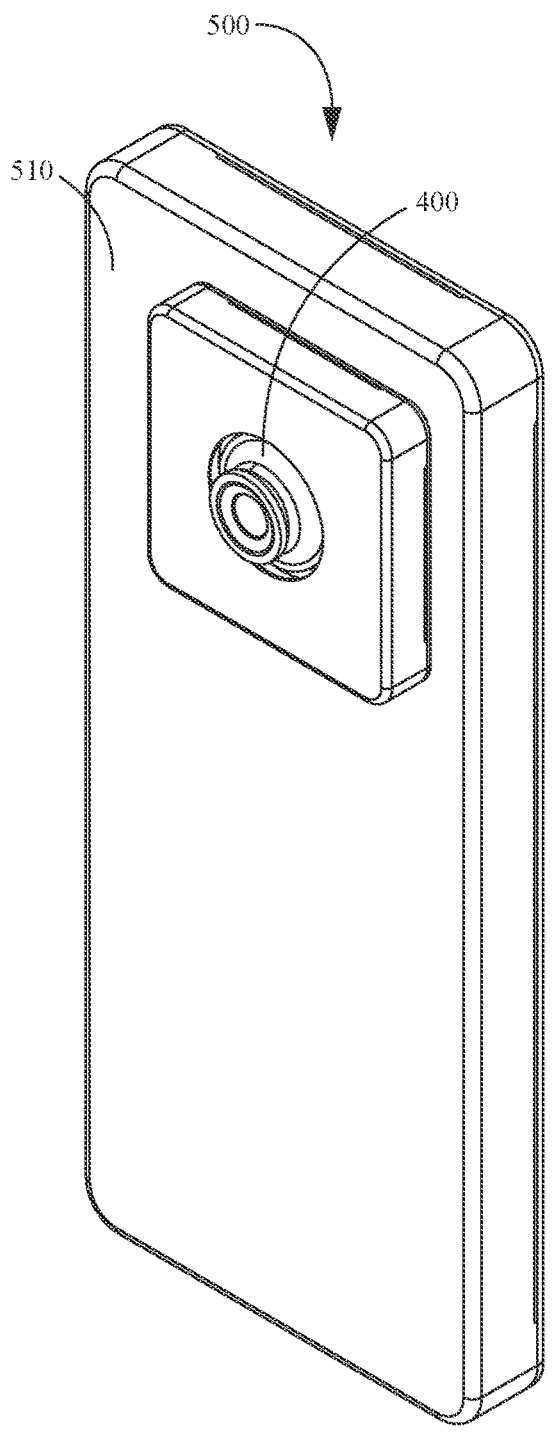
FIG. 17 is a schematic structural view of an electronic device provided according to a fifth embodiment of the present application.

An electronic device 500 is provided according to the fifth embodiment of the present application, as shown in FIG. 17, and the electronic device 500 includes a device body 510 and a camera module 400 according to any of the above embodiments, and the camera module 400 is provided on the device body 510.

In this embodiment, the electronic device 500 may be a smartphone, a tablet, a smartwatch, a camera, or other electronic devices provided with the camera module provided according to the present application, which is not specifically limited by the present application.

The camera module and the electronic device provided according to the embodiments of the present application are described in detail. Specific examples are applied herein to explain the principles and embodiments of the present application. The above embodiments are only used to help understand the ideas of the present application, and there may be changes in the specific embodiments and application scope. In summary, the content of the specification should not be understood as a limitation on the present application.

What is claimed is:

1. A camera module, comprising:
a lens having an optical axis;
an autofocus mechanism including a cylinder, wherein the cylinder has an axis coincided with the optical axis, and the lens is accommodated within the cylinder;
a driving coil group fixed on an inner wall of the cylinder;
a blade support member coaxially arranged with the lens and fixed on an object side of the lens;
a blade driven ring coaxially arranged with the lens and rotatably engaged with an object side of the blade support member;
a driven magnetic member group fixed to the blade driven ring and arranged opposite to the driving coil group; and
a shading blade, wherein the shading blade is arranged between the blade support member and the blade driven ring, and is rotatably connected to the blade support member, the driving coil group is configured to drive the driven magnetic member group to drive the blade driven ring to rotate around the optical axis, so that the shading blade is driven to block or expose the lens;

wherein the driven magnetic member group includes a first magnetic member and a second magnetic member, a magnetic pole of the first magnetic member facing towards the driving coil group has different polarities from a magnetic pole of the second magnetic member facing towards the driving coil group, and the first magnetic member and the second magnetic members are arranged at intervals circumferentially around the optical axis;

wherein the driving coil group includes three adjacent driving coils disposed at intervals, the driving coil located in the middle is the first driving coil, while the two driving coils on both sides of the first driving coil are the second driving coils, one of the second driving coils has the same current direction as the first driving coil, while the other second driving coil has the opposite current direction, and in response to different driving coils being energized, magnetic fields in different directions are generated, so that the first magnetic member and the second magnetic member are subjected to forces with a same direction to drive the blade driven ring to rotate around the optical axis.

2. The camera module according to claim 1, wherein there are a plurality of driven magnetic member groups arranged at intervals along a circumferential direction of the blade driven ring, and a plurality of driving coil groups arranged at intervals along a circumferential direction of the cylinder.

3. The camera module according to claim 1, wherein the blade support member is provided with a positioning hole extending axially, a positioning portion is provided on an image side of the shading blade, and the positioning portion is configured to rotatably extend into the positioning hole.

4. The camera module according to claim 3, wherein the blade driven ring is provided with a through groove extending radially along the blade driven ring, a sliding portion is provided on an object side of the shading blade, and the sliding portion is configured to slidably extend into the through groove.

5. The camera module according to claim 1, further including a flexible circuit board, wherein the flexible circuit board is sleeved on an outer circumference of the cylinder and electrically connected to the driving coil group.

6. The camera module according to claim 5, further including a position detecting element fixed on an inner wall of the cylinder and electrically connected to the flexible circuit board, wherein the position detecting element is configured to detect a position of the driven magnetic member group to detect a position of the shading blade.

7. An electronic device, comprising a device body and a camera module according to claim 1, wherein the camera module is arranged on the device body.

8. A camera module, comprising:
a lens having an optical axis;
an autofocus mechanism including a cylinder, wherein the cylinder has an axis coincided with the optical axis, and the lens is accommodated within the cylinder;
a driving coil group fixed on an inner wall of the cylinder;
a blade support member coaxially arranged with the lens and fixed on an object side of the lens;

a blade driven ring coaxially arranged with the lens and rotatably engaged with an object side of the blade support member;
a driven magnetic member group fixed to the blade driven ring and arranged opposite to the driving coil group; and
a shading blade, wherein the shading blade is arranged between the blade support member and the blade driven ring, and is rotatably connected to the blade support member, the driving coil group is configured to drive the driven magnetic member group to drive the blade driven ring to rotate around the optical axis, so that the shading blade is driven to block or expose the lens;

wherein each of the plurality of driving coil groups includes a cylindrical coil, which has a winding axis that does not intersect the blade support member, and each of the plurality of driven magnetic member groups includes a driven magnet, in response to the cylindrical coil being energized, the driven magnet is driven to depart from or approach to the cylindrical coil, and the driven magnet is configured to drive the blade driven ring to rotate to enable the shading blade to block or expose the lens;

wherein there are a plurality of cylindrical coils arranged at intervals along a circumferential direction of the cylinder, and a plurality of driven magnets arranged at intervals along a circumferential direction of the blade driven ring, two magnetic poles of any respective two adjacent driven magnets are arranged opposite along the circumferential direction of the blade driven ring, in response to any respective two adjacent cylindrical coils being energized, magnetic fields in different directions are generated to force the driven magnet arranged between the respective two cylindrical coils in a same direction and drive the blade driven ring to rotate.

9. The camera module according to claim 8, wherein the plurality of cylindrical coils and the plurality of driven magnets are disposed alternately along circumferential direction of the blade driven ring.

10. The camera module according to claim 8, wherein the blade support member is provided with a positioning hole extending axially, a positioning portion is provided on an image side of the shading blade, and the positioning portion is configured to rotatably extend into the positioning hole.

11. The camera module according to claim 10, wherein the blade driven ring is provided with a through groove extending radially along the blade driven ring, a sliding portion is provided on an object side of the shading blade, and the sliding portion is configured to slidably extend into the through groove.

12. The camera module according to claim 8, further including a flexible circuit board, wherein the flexible circuit board is sleeved on an outer circumference of the cylinder and electrically connected to the driving coil group.

13. The camera module according to claim 12, further including a position detecting element fixed on an inner wall of the cylinder and electrically connected to the flexible circuit board, wherein the position detecting element is configured to detect a position of the driven magnetic member group to detect a position of the shading blade.

* * * * *